(12) United States Patent
Bohren et al.

(10) Patent No.: US 10,859,510 B2
(45) Date of Patent: Dec. 8, 2020

(54) ROBOTIC SENSOR SYSTEM FOR MEASURING PARAMETERS OF A STRUCTURE

(71) Applicant: Honeybee Robotics, Ltd., Brooklyn, NY (US)

(72) Inventors: Jonathan Bohren, Brooklyn, NY (US); Jack Wilson, Brooklyn, NY (US); Anthony G. Musco, Secaucus, NJ (US); Christopher D. Bolger, Hastings-on-Hudson, NY (US)

(73) Assignee: HONEYBEE ROBOTICS, LTD., Brooklyn, NY (US)

( * ) Notice: Subject to any disclaimer, the term of this patent is extended or adjusted under 35 U.S.C. 154(b) by 0 days.

(21) Appl. No.: 16/684,866

(22) Filed: Nov. 15, 2019

(65) Prior Publication Data

US 2020/0225170 A1 Jul. 16, 2020

Related U.S. Application Data

(60) Provisional application No. 62/792,980, filed on Jan. 16, 2019.

(51) Int. Cl.
 *G01N 21/952* (2006.01)
(52) U.S. Cl.
 CPC .................. *G01N 21/952* (2013.01)
(58) Field of Classification Search
 CPC .............. G01N 2021/9518; G01N 21/952
 See application file for complete search history.

(56) References Cited

U.S. PATENT DOCUMENTS

| 4,223,753 A | 9/1980 | Bradbury |
| 4,995,320 A | 2/1991 | Sato et al. |

(Continued)

FOREIGN PATENT DOCUMENTS

| CN | 105643412 A | 6/2016 |
| GB | 957180 A | 5/1964 |

(Continued)

OTHER PUBLICATIONS

Choi, C., et al., "Inch-Worm Robot with Automatic Pipe Tracking Capability for the Feeder Pipe Inspection of a PHWR" Journal of Institute of Control, Robotics and Systems vol. 14, No. 2, Feb. 2008 pp. 125-140.

(Continued)

*Primary Examiner* — Steven Whitesell Gordon
(74) *Attorney, Agent, or Firm* — Cantor Colburn LLP

(57) ABSTRACT

A sensor system for measuring and locating parameters of a structure includes a robot configured to move between a first position and a second position along the structure. An inspection sensor is coupled to the robot and configured to measure a parameter associated with the structure. A localization sensor suite includes an inertial measurement unit and is configured to capture data associated with translational degrees of freedom and a rotational degree of freedom of the robot determined by the structure and an image capture system mounted to the robot. The image capture system acquires images of the structure. One or more processors is operatively connected to the localization sensor suite. The one or more processors is responsive to non-transitory executable computer instructions for generating a map of the route including features of the structure, the measured parameters, and a position of the robot relative to the structure.

21 Claims, 3 Drawing Sheets

(56) References Cited

U.S. PATENT DOCUMENTS

| | | | |
|---|---|---|---|
| 5,186,270 | A | 2/1993 | West |
| 5,736,821 | A * | 4/1998 | Suyama ............... F16L 55/26 318/16 |
| 5,868,600 | A | 2/1999 | Watanabe |
| 6,726,524 | B2 | 4/2004 | Yamaguchi et al. |
| 7,256,559 | B2 | 8/2007 | Zhang |
| 7,594,448 | B2 | 9/2009 | Jacobson et al. |
| 7,656,997 | B1 * | 2/2010 | Anjelly ............... G01N 23/04 378/59 |
| 8,041,517 | B2 | 10/2011 | Thayer et al. |
| 8,141,442 | B2 | 3/2012 | Roberts |
| 8,605,145 | B2 | 12/2013 | Webster et al. |
| 8,619,134 | B2 | 12/2013 | Christ |
| 9,056,746 | B2 | 6/2015 | Mehrandezh et al. |
| 9,360,311 | B2 * | 6/2016 | Gonzalez ............ G05D 1/0268 |
| 9,389,150 | B2 * | 7/2016 | Kimpel, Jr. ......... G01M 99/00 |
| 9,616,948 | B2 | 4/2017 | Ben-Tzvi et al. |
| 9,632,504 | B1 | 4/2017 | Watts |
| 9,724,789 | B2 | 8/2017 | Matthews et al. |
| 9,758,133 | B2 | 9/2017 | Mistrot et al. |
| 9,789,605 | B2 | 10/2017 | Meier et al. |
| 9,863,919 | B2 | 1/2018 | Carrasco Zanini et al. |
| 2006/0290779 | A1 * | 12/2006 | Reverte ................ E03F 7/10 348/84 |
| 2008/0068601 | A1 | 3/2008 | Thayer et al. |
| 2010/0131210 | A1 * | 5/2010 | Fingerhut ............ G01N 27/90 702/38 |
| 2014/0156067 | A1 * | 6/2014 | An ...................... G01N 29/2412 700/245 |
| 2015/0350506 | A1 | 12/2015 | Olsson et al. |
| 2016/0059939 | A1 | 3/2016 | Lamonby et al. |
| 2016/0188977 | A1 | 6/2016 | Kearns et al. |
| 2016/0320266 | A1 | 11/2016 | Kimpel, Jr. et al. |
| 2017/0131214 | A1 * | 5/2017 | Gutierrez Perez ..................... G01N 21/9515 |
| 2017/0278587 | A1 | 9/2017 | Futin et al. |
| 2018/0080905 | A1 | 3/2018 | Al Nahwi et al. |
| 2018/0149622 | A1 | 5/2018 | Vieau et al. |

FOREIGN PATENT DOCUMENTS

| | | |
|---|---|---|
| GB | 2551609 A | 12/2017 |
| JP | 2533027 B2 | 6/1993 |
| WO | 8606696 A1 | 11/1986 |
| WO | 0246031 A1 | 6/2002 |

OTHER PUBLICATIONS

Ibarguren, A. et al., "Thermal Tracking in Mobile Robots for Leak Inspection Activities" Sensors 2013, 13, pp. 13560-13574. ISSN 1424-8220.

International Search Report and Written Opinion for International Application No. PCT/US2019/062937; International Filing Date Nov. 25, 2019; Report dated Feb. 3, 2020 (pp. 1-17).

Martínez-Gómez, Jesus, et al., "A Taxonomy of Vision Systems for Ground Mobile Robots" Int J Adv Robot Syst, 2014, 11:111 (27 pgs) doi: 10.5772/58900.

Murta, A.C., et al., "IMU and Cable Encoder Data Fusion for In-Pipe Mobile Robot Localization" CETaqua, Water Technological Center. Barcelona, Catalunya, Spain, retreived from internet URL: https/www.iri.upc.edu/files/scidoc/1474-IMU-and-Cable-Encoder [retrieved on Aug. 13, 2018] (6 pgs).

Tadakuma, Kenjiro, et al. "Crawler mechanism with circular section to realize a sideling motion." Proceedings of the 2008 IEEE International Conference on Intelligent Robots and Systems, 2008. (pp. 1-6).

Tache, Fabien, et al. "Adapted magnetic wheel unit for compact robots inspecting complex shaped pipe structures." 2007 IEEE/ASME international conference on advanced intelligent mechatronics, IEEE, 2007. (pp. 1-6).

Kania, Richard. "Automated Inspection of External Pipeline Corrosion With Laser-Based Pipeline Inspection Tool." 2000 3rd International Pipeline Conference. American Society of Mechanical Engineers, 2000. (pp. 809-815).

Singh, Puneet and G. K. Ananthasuresh. "A compact and compliant external pipe-crawling robot" IEEE transactions on robotics 29.1 (2013). (pp. 251-260).

Jiang, Bing, et al. "Autonomous robotic monitoring of underground cable systems." ICAR'05. Proceedings., 12th International Conference on Advanced Robotics, IEEE, 2005. (pp. 1-7).

* cited by examiner

ROBOTIC SENSOR SYSTEM FOR MEASURING PARAMETERS OF A STRUCTURE

CROSS REFERENCE TO RELATED APPLICATIONS

This application claims the benefit of an earlier filing date from U.S. Provisional Application Ser. No. 62/792,980 filed Jan. 16, 2019, the entire disclosure of which is incorporated herein by reference.

INTRODUCTION

The subject disclosure relates to the art of sensors for robotics and, more particularly, to a robotic sensor system for measuring parameters of a structure.

From time to time it may be desirable to inspect a structure such as a bridge, an oil platform, pipes and the like. The inspection may reveal a need for maintenance in one or more areas of the structure. Structures may be difficult for people to access or traverse and thus robotic conveyance systems may be employed to collect sensor data for inspection purposes. One drawback with current systems is a lack of knowledge of a specific location of the data collected by the robotic conveyance system relative to the structure. Pinpointing the location of the sensor data on the structure is helpful in reporting an area than may benefit from maintenance. Accordingly, it is desirable to provide a robotic conveyance system that may have knowledge of and communicate its precise location relative to the structure.

SUMMARY

Disclosed is a sensor system for measuring and locating parameters of a structure including a robot configured to move along a route in an environment between a first position and a second position along the structure. At least one inspection sensor is coupled to the robot and configured to measure at least one parameter associated with the structure. A localization sensor suite includes an inertial measurement unit and is configured to capture data associated with translational degrees of freedom and a rotational degree of freedom of the robot determined by the structure and at least one image capture system mounted to the robot. The at least one image capture system is operable to acquire a plurality of images of the structure. One or more processors is operatively connected to the localization sensor suite. The one or more processors is responsive to non-transitory executable computer instructions for generating a map of the route followed along the structure by the robot between the first position and the second position. The map includes one or more features of the structure captured from the plurality of images, the measured parameters associated with the structure, and a position of the robot relative to the structure based on the translational degrees of freedom and the rotational degree of freedom of the robot determined by the structure.

Also disclosed is a sensor system including a structure having a surface, and a robot configured to move along a route in an environment between a first position and a second position relative to the structure. At least one inspection sensor is coupled to the robot and configured to measure at least one parameter associated with the structure. A localization sensor suite includes an inertial measurement unit configured to determine translational degrees of freedom and rotational degrees of freedom of the robot as determined by the structure and at least one image capture system mounted to the robot. The at least one image capture system is operable to acquire a plurality of images of the structure. One or more processors is operatively connected to the localization sensor suite. The one or more processors is responsive to non-transitory executable computer instructions for generating a map of the route followed along the structure by the robot between the first position and the second position. The map includes one or more features of the structure captured from the plurality of images, the at least one parameter associated with the structure, and the position of the robot relative to the structure based on the translational degrees of freedom and the rotational degrees of freedom of the robot determined by the structure.

Further disclosed is a method of inspecting a structure including positioning a robot at a structure, moving the robot from a first position to a second position relative to the structure, measuring at least one parameter associated with the structure through a sensor supported by the robot, determining three translational degrees of freedom and a rotational degree of freedom of the robot, acquiring one or more images of the structure with an image capture system supported by the robot, and generating a map of a route followed along the structure by the robot, the map including one or more features of the structure captured from the one or more images, and the position of the robot relative to the structure based on the three translational degrees of freedom and the rotational degree of freedom.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
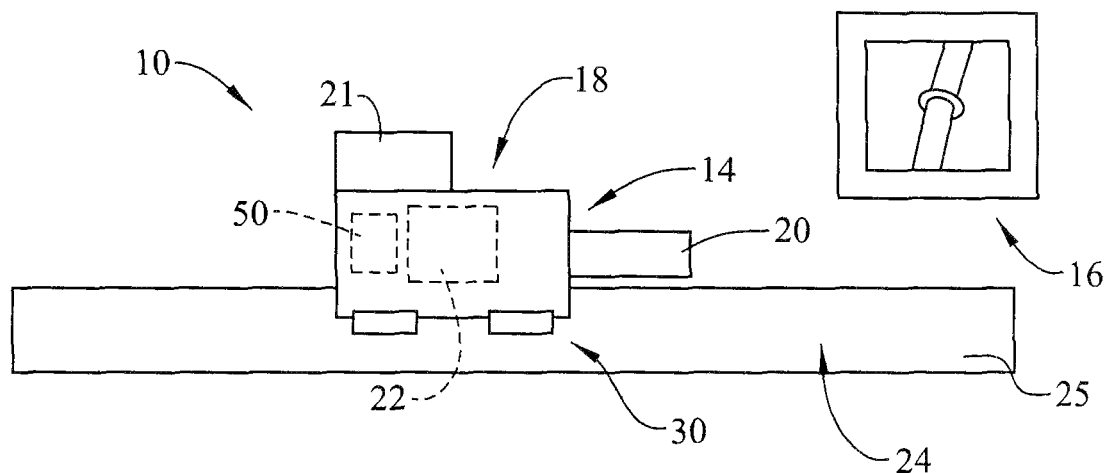
FIG. 1 depicts a robotic sensor system supported on a structure, in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
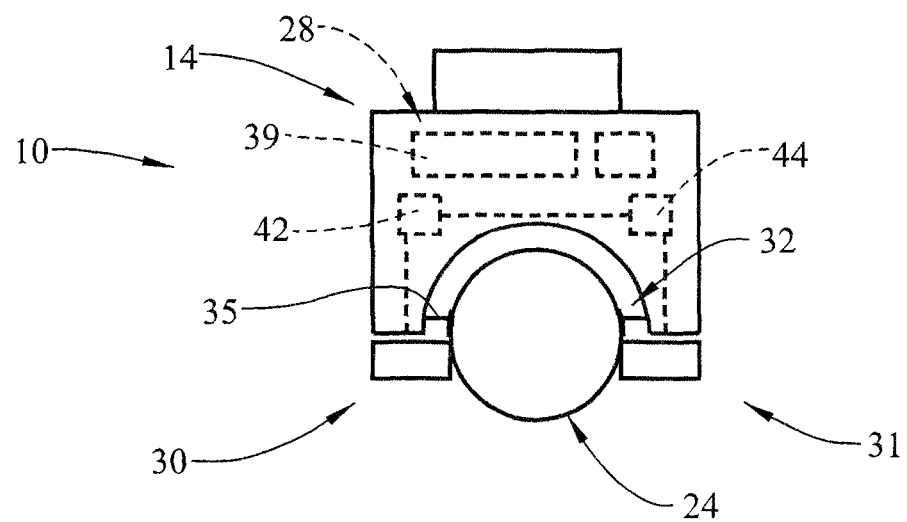
FIG. 2 depicts an end view of the robotic sensor system of FIG. 1, in accordance with an aspect of an exemplary embodiment.
Figure 3:
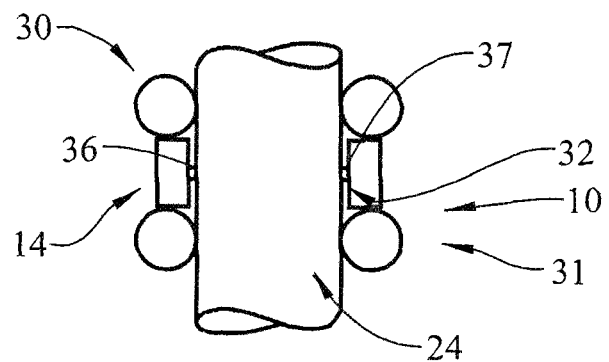
FIG. 3 depicts a bottom view of the robotic sensor system of FIG. 1, in accordance with an aspect of an exemplary embodiment.

A robotic sensor system, in accordance with an exemplary embodiment, is indicated generally at 10 in FIGS. 1-3. Robotic sensor system 10 includes a robot 14 that may be coupled to a display 16. Robot 14 may be coupled to display 16 through a wireless connection. Alternatively, data may be stored at, and collected from, robot 14 and delivered wirelessly, or through a wired connection, to display 16. Robot 14 may support a localization sensor suite 18 and an inspection sensor 20.

In an embodiment, localization sensor suite may include one or more image capture systems that may take the form of cameras, LIDAR, RADAR, SONAR and the like, indicated generally at 21, and an inertial measurement unit (IMU) 22 that may include various accelerometers, gyroscopes, and other sensors (not shown) that capture data that could be used to compute into translational degrees of freedom and rotational degrees of freedom of robot 14 associated with a structure 24 having a predetermined shape. At this point, it should be understood that the phrase "predetermined shape" describes that the structure is composed of sub-structures having known shapes. The particular arrangement and connection of the substructures may not be known. The number of translational and rotational degrees of freedom is constrained by surface characteristics of structure 24.

In an embodiment, structure 24 is shown in the form of a pipe 25. Thus, in the case of pipe 25, the predetermined shape is generally round. Further, the predetermined shape of pipe 25 determines how many degrees of freedom of movement would be available for robot 14. For example, pipe 25 would be would limit or constrain robot 14 to two (2) translational degrees of freedom and two (2) rotational degrees of freedom. Robot 14 also includes a movement assembly 28 that promotes movement of robot 14 along a route from a first position to a second position relative to structure 24.

In an embodiment, movement assembly 28 includes a first pair of wheels 30 arranged on a first side of robot 14 and a second set of wheels 31 arranged on a second side of robot 14. Movement assembly 28 may also include a clamping mechanism 32 that promotes an attachment of robot 14 to structure 24. Clamping mechanism 32 may include a first clamp member 36 and a second clamp member 37 that may be selectively positionable on structure 24. First and second clamp members 35 and 37 may be formed so as to smoothly transition along structure 24.

Movement assembly 28 may also include a motor 39 that drives first set of wheels 30 through a first gearbox 42 and second set of wheels 31 through a second gearbox 44. Of course, it should be understood that first set of wheels 30 and second set of wheels 31 may be driven by motor 39 by a single gearbox. At this point, it should be understood that while described as including a movement assembly, robot 14 may also be moved manually along structure 24. It should also be understood that robot 14 may take the form of self-contained hand held device that is moved along a continuous or discontinuous route or path relative to the structure and operates to locate and save a location of areas of interest on structure 24 as will be detailed herein. The self-contained hand held device could include a dedicated display and various interface members that allow data transfer to and from other systems.

Figure 4:
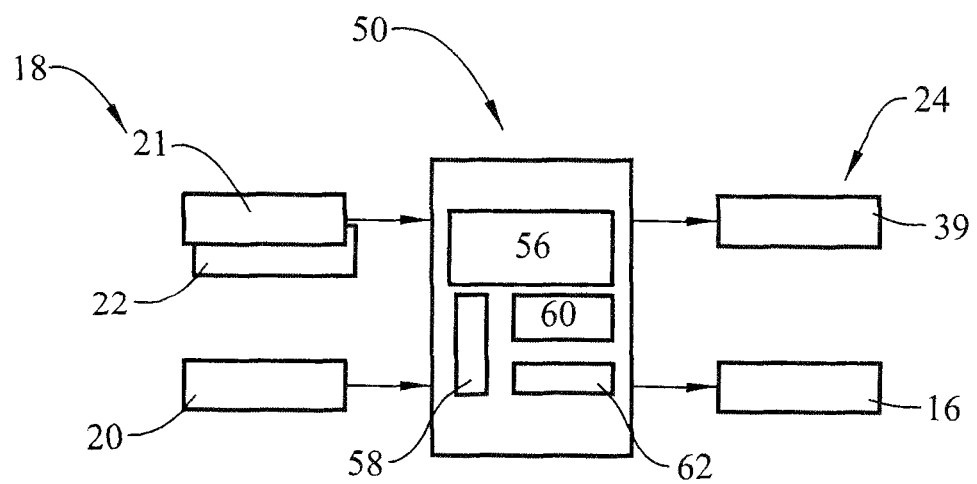
FIG. 4 depicts a controller of the robotic sensor system of FIG. 1, in accordance with an aspect of an exemplary embodiment.

Referring to FIG. 4, robot 14 also includes a controller 50 having one or more processors 56 and a non-volatile memory 58. Processors 56 may take on a variety of forms including central processor units (CPUs), graphics processor units (GPUs), and the like. Controller 50 may also include a drive module 60 that controls movement assembly 28, and a sensor module 62 that receives data from localization sensor suite 18 and inspection sensor(s) 20. Sensor module 62 may compute location information of robot 14 from the data provided by localization sensor suite 18. Sensor module 62 may also compute one or more parameters of structure 24 based on data from inspection sensor 20. Further, sensor module 62 may transmit data from localization sensor suite 18 and/or inspection sensor 20 to, for example, non-volatile memory 58. Non-volatile memory 58 may also include a set of instructions for operating robot 14 such as commands for collecting sensor data, moving along structure 24, and transmitting data from robot 14 to be viewed by an operator.

Figure 5:
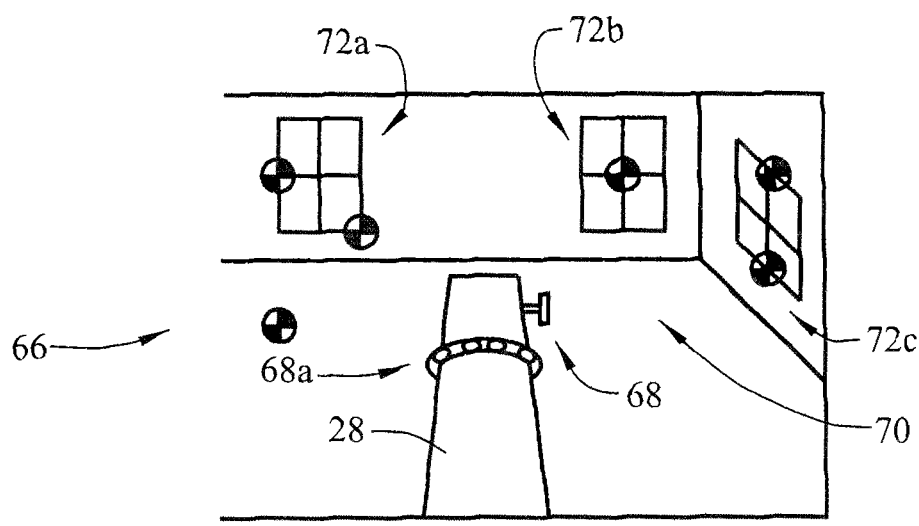
FIG. 5 depicts an image of the structure, including features on the structure and features in an environment around the structure, in accordance with an aspect of an exemplary embodiment.

In an embodiment, robot 14 may be positioned upon structure 24. Movement assembly 28 may be operated by controller 50 to transition along a surface (not separately labeled) of structure 24 through, for example, instructions stored in non-volatile members 58 or through inputs received from a remote operator. In operation, camera 18 may capture a series of images such as shown in FIG. 5 at 66. Images 66 may include features 68a, and 68b of structure 24. Feature 68a may represent an obstacle such as a flange and feature 68b may represent an obstacle such as a valve, a tap, or the like. Camera 18 may also capture details of an environment 70 surrounding structure 24. Thus, the series of images 66 may include environmental features 72a-72C.

Figure 6:
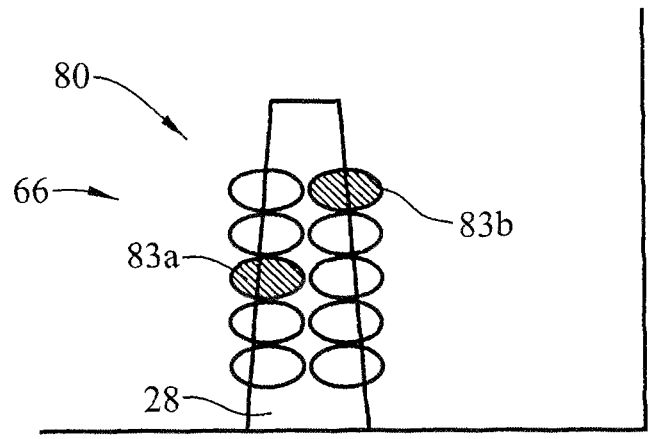
FIG. 6 depicts locations of out of specification parameters on the structure, in accordance with an aspect of an exemplary embodiment.

In an embodiment, series of images 66 also depict sensor measurements such as shown at 80 in FIG. 6. Sensor measurements 80 may include parameters that are determined to be out of spec 83a and 83b. Parameters that are out of spec can be determined by a user and/or based on stored values associated with the structure. Parameters that are out of spec 83a and 83b, such as increased corrosion, may be stored and superimposed onto structure 24 allowing operators to properly identify where maintenance may be needed. In an embodiment, controller 50 may employ data captured by localization sensor suite 18 to compute the three translational degrees of freedom (or in the case of pipe 25, two translational degrees of freedom) and the rotational degree of freedom of robot 14 to correlate data captured by inspection sensor 20 to a particular location on structure 24. In this manner, maintenance may be targeted to a location on structure 24 with greater accuracy. In addition to storing parameters that may be out of spec, in spec parameters may also be stored. In this manner, operators may review all collected data to determine what areas are and what areas may not be out of spec.

In an embodiment, robot 14 may encounter obstacles along structure 24 such as a flange (feature 68a in FIG. 5). Movement assembly 28 may be configured to cause a portion of robot 14 to lift off of structure 24, and translate over the obstacle. During translation over the obstacle, localization sensor suite 18 continues to capture data for computing the location and orientation of robot 14 relative to structure 24.

The terms "about" and "substantially" are intended to include the degree of error associated with measurement of the particular quantity based upon the equipment available at the time of filing the application. For example, "about" and "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A sensor system for measuring and locating parameters of a structure, the sensor system comprising:
   a robot configured to move along a route in an environment between a first position and a second position along an external surface of the structure;
   at least one inspection sensor coupled to the robot and configured to measure at least one parameter associated with the structure;
   a localization sensor suite including an inertial measurement unit configured to capture data associated with translational degrees of freedom and a rotational degree of freedom of the robot determined by the structure, and at least one image capture system mounted to the robot, the at least one image capture system being operable to acquire a plurality of images of the structure; and
   one or more processors operatively connected to the localization sensor suite, the one or more processors being responsive to non-transitory executable computer instructions for generating a map of the route followed along the structure by the robot between the first position and the second position, the map including one or more features of the structure captured from the plurality of images, the measured parameters associated with the structure, and a position of the robot relative to the structure based on the translational degrees of freedom and the rotational degree of freedom of the robot determined by the structure, wherein the executable computer instructions are further responsive for determining when the parameter is out of specification and storing the position of the robot on the map when the parameter is out of specification.

2. The system of claim 1, further comprising a display separate from and coupled for communication to the robot, the display having a first element showing the map, a second element showing an image acquired by the at least one image capture system with identified natural features of the environment superimposed thereon, and a third element showing the image and locations of sensor measurements superimposed thereon.

3. The system of claim 1, wherein the at least one parameter comprises a level of corrosion on the structure.

4. The system of claim 1, wherein the structure is a pipe.

5. The system of claim 1, wherein the robot includes a movement assembly for moving the robot along and in contact with the structure.

6. A sensor system comprising:
   a structure including an external surface;
   a robot configured to move along a route in an environment between a first position and a second position along the external surface of the structure;
   at least one inspection sensor coupled to the robot and configured to measure at least one parameter associated with the structure;
   a localization sensor suite including an inertial measurement unit configured to determine translational degrees of freedom and rotational degrees of freedom of the robot as determined by the structure, and at least one image capture system mounted to the robot, the at least one image capture system being operable to acquire a plurality of images of the structure; and
   one or more processors operatively connected to the localization sensor suite, the one or more processors being responsive to non-transitory executable computer instructions for generating a map of the route followed along the structure by the robot between the first position and the second position, the map including one or more features of the structure captured from the plurality of images, the at least one parameter associated with the structure, and the position of the robot relative to the structure based on the translational degrees of freedom and the rotational degrees of freedom of the robot determined by the structure, wherein the executable computer instructions are further responsive for determining when the parameter is out of specification and storing the position of the robot on the map when the parameter is out of specification.

7. The sensor system of claim 6, further comprising a display separate from and coupled for communication to the robot, the display having a first element showing the map, a second element showing an image acquired by the at least one image capture system with identified natural features of the environment superimposed thereon, and a third element showing the image and locations of sensor measurements superimposed thereon.

8. The sensor system of claim 6, wherein the at least one parameter comprises a level of corrosion on the structure.

9. The system of claim 6, wherein the structure is a pipe.

10. The sensor system of claim 6, wherein the robot is attached to the structure.

11. The sensor system according to claim 6, wherein the robot includes a movement assembly for moving the robot along the route.

12. The sensor system according to claim 11, wherein the movement assembly includes a clamping mechanism that secures the robot to the structure.

13. A method of inspecting a structure comprising:
   positioning a robot on an external surface of a structure;
   moving the robot from a first position to a second position along the external surface of the structure;
   measuring at least one parameter associated with the structure through a sensor supported by the robot;
   determining three translational degrees of freedom and a rotational degree of freedom of the robot;
   acquiring one or more images of the structure with an image capture system supported by the robot;
   generating a map of a route followed along the structure by the robot, the map including one or more features of the structure captured from the one or more images, and the position of the robot relative to the structure based on the three translational degrees of freedom and the rotational degree of freedom;

determining, at the robot when the parameter is out of specification; and storing the position of the robot on the map when the parameter is out of specification.

14. The method of claim 13, further comprising: displaying the map on a display that is remote from the robot.

15. The method of claim 14, wherein displaying the map includes displaying an image acquired by the image capture system with identified natural features of the structure superimposed thereon.

16. The method of claim 15 wherein displaying the map includes showing the image and locations of sensor measurements superimposed thereon.

17. The method of claim 16, wherein displaying the map includes displaying features in an environment surrounding, at least in part, the structure.

18. The method of claim 13, wherein determining when the parameter is out of specification includes measuring a level of corrosion on the structure as the robot moves from the first position to the second position.

19. The method of claim 13, wherein positioning the robot at the structure includes positioning the robot on a pipe.

20. The method of claim 13, wherein positioning the robot at the structure includes attaching the robot to the structure.

21. The method of claim 13, wherein moving the robot from the first position to the second position includes operating a movement assembly of the robot.

* * * * *